United States Patent
Moltzan et al.

(10) Patent No.: US 11,803,419 B2
(45) Date of Patent: *Oct. 31, 2023

(54) BRANCH PREDICTION FOR USER INTERFACES IN WORKFLOWS

(71) Applicant: ORACLE INTERNATIONAL CORPORATION, Redwood Shores, CA (US)

(72) Inventors: Terrence A. Moltzan, Bozeman, MT (US); Zachary M. Connelly, Bozeman, MT (US); Jens O. Lundell, Santa Cruz, CA (US); Aaron M. Schubert, Bozeman, MT (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/965,101

(22) Filed: Oct. 13, 2022

(65) Prior Publication Data

US 2023/0047739 A1     Feb. 16, 2023

Related U.S. Application Data

(63) Continuation of application No. 16/693,455, filed on Nov. 25, 2019, now Pat. No. 11,474,860.

(51) Int. Cl.
*G06F 9/48*      (2006.01)
*G06F 8/38*      (2018.01)

(52) U.S. Cl.
CPC .............. *G06F 9/4881* (2013.01); *G06F 8/38* (2013.01)

(58) Field of Classification Search
CPC .................................. G06F 9/4881; G06F 8/38
See application file for complete search history.

(56) References Cited

U.S. PATENT DOCUMENTS

2007/0011334 A1*    1/2007    Higgins .............. G06F 11/3604
                                                              709/227

OTHER PUBLICATIONS

Carbune et al.; Visual User Interface (UI) Interaction Prediction, Feb. 26, 2019, 11 pgs., downloaded an Oct. 1, 2019 from: https://www.tdcommons.org/dpubs_series/1982.

(Continued)

*Primary Examiner* — Wissam Rashid
(74) *Attorney, Agent, or Firm* — Kraguljac Law Group, LLC

(57) ABSTRACT

Systems, methods, and other embodiments associated with branch prediction in workflows are described. In one embodiment, a method includes inputting a workflow and serially progressing through the workflow in a flow sequence and in response to the flow sequence encountering a first decision element in the workflow that includes a plurality of branch paths: (i) executing a prediction that predicts a resulting path of the first decision element to predict a first user interface from the plurality of user interfaces that may be encountered subsequently in the flow sequence as part of a first terminal element; and (ii) pre-building the first user interface that is predicted prior to encountering the first terminal element. In response to the flow sequence reaching the first terminal element, displaying the pre-built first user interface on a display device.

20 Claims, 4 Drawing Sheets

(56) References Cited

OTHER PUBLICATIONS

Jiayi Huang; Tournament Predictors Example, Texas A & M University; pp. 1-14, downloaded on Nov. 21, 2019 from https://www.academia.edu/33103315/Tournament_Predictors_Example.
Patent Cooperation Treaty (PCT) International Search Report and Written Opinion issued in PCT International Application No. PCT/US2020/060401 (International Filing Date Nov. 13, 2020), dated Mar. 1, 2021 (11pgs).

\* cited by examiner

BRANCH PREDICTION FOR USER INTERFACES IN WORKFLOWS

CROSS REFERENCE TO RELATED APPLICATIONS

This disclosure claims the benefit of U.S. Utility patent application Ser. No. "16/693,455" filed Nov. 25, 2019, titled "Branch Prediction for User Interfaces in Workflows," inventors: Moltzan, et al., and assigned to the present assignee, which is incorporated by reference herein in its entirety for all purposes.

BACKGROUND

A workflow is a computerized structure that defines a series of actions that are executed and completed sequentially. In general, a workflow can be created to correspond to a particular process or task. The workflow can be visually represented as a flowchart or tree structure that includes multiple branches of possible paths that can be traversed during execution until an end point is reached. The workflow includes decision elements that control the execution of the workflow and control which branch paths to take. Ultimately, the execution path lands on one of many possible workspace elements that initiate or perform an action.

User defined workflows can be arbitrarily complex. The more elements a workflow has and the more complex it is, the workflow requires more time to complete. A user and the executing computing device require more time to sequentially traverse the workflow from a start point to one of the multiple end points and execute the programmed actions of a workspace element.

In prior systems, the execution and run time of a workflow was restricted by the decision elements and the serial execution along a path. Decision elements were required to wait for input data before any decision could be made and then continue along a path to the next action element. For example, a decision element may be based upon a particular field value on a given data record. Thus the data record must be retrieved via a network request and then the field value can be determined. Based on the result of the decision, the system would generate one or more distinct user interfaces.

Thus any elements in the path after the decision element could not be executed until the decision element executed and the serial processing along the path reached the element. This resulted in a performance penalty on the system and on clients waiting for the system, since no view models or views could be built until the data was retrieved from a data center. Processing of the workflow and subsequent display of record values is time critical in many high transaction volume environments, such as call centers. Thus any reduction in processing time is an improvement to computer functionality.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Computer systems and methods are described herein that are configured to make branch predictions in an executing workflow and predict a resulting user interface from multiple possible user interfaces. The predicted user interface is then pre-built in advance of the executing workflow reaching the user interface. The present systems and methods provide quicker response times and avoid the time delays associated with a serially executing workflow that is serially dependent upon and restricted by decision elements. These decision elements require retrieving and loading data records in order to determine a result of the decision element, after which execution proceeds along the serial/sequential processing path of the workflow to render a final user interface.

In one embodiment, the present systems and methods remove the serial dependency between data loading and the rendering of a customized user interface and thus improves the computer functionality over prior techniques by predicting and pre-building a user interface in advance. Additionally, the predicting and pre-building functions reduce processing time as compared to the serial dependency processing and further improves the computer functionality. As previously stated, in many high transaction volume environments, such as call centers, the generation and display of record values by the computing system in a user interface is time critical. Thus a reduction in processing time (even milliseconds) is an improvement to the computer functionality.

It should be understood that no action or function described or claimed herein is performed by the human mind, and cannot be practically performed in the human mind. An interpretation that any action or function can be performed in the human mind is inconsistent and contrary to this disclosure.

Figure 1:
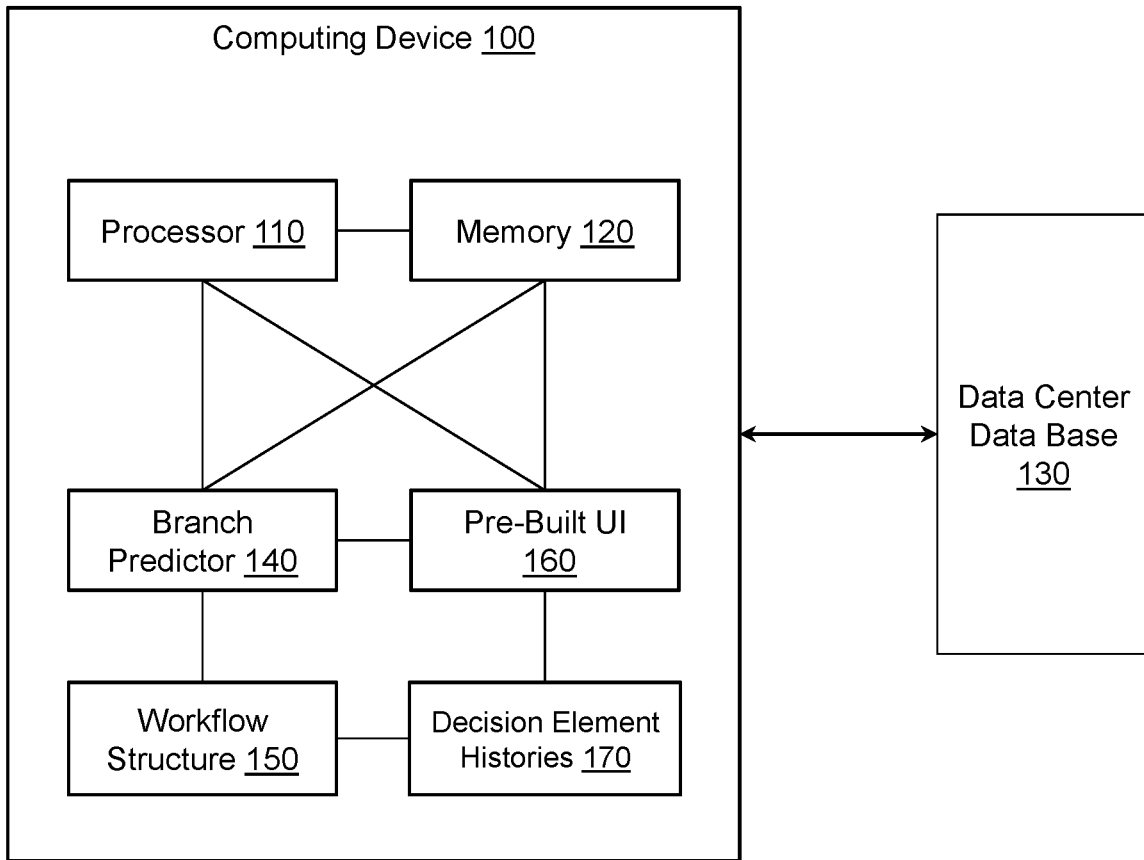
FIG. 1 illustrates one embodiment of a computer system associated with predicting branches of a workflow and pre-building a user interface.

With reference to FIG. 1, one embodiment is illustrated of a computing device 100 configured with a prediction system for making branch predictions in a workflow to predict and pre-build a user interface. The computing device 100 includes at least one processor 110, memory 120, and network interfaces to communicate with remote devices such as a data center database 130 and/or other remote computers (not shown). The prediction system includes a branch predictor 140 that executes on a workflow structure 150 that is inputted into memory. As will be described herein, the brand predictor 140 removes the serial dependency between data loading and rendering of a user interface by leveraging historical data from previous path taken at each decision element (e.g., decision element histories 170). The prediction system is configured to learn and then predict an appropriate user interface that is likely to be rendered.

The system then begins to pre-build the user interface (e.g., pre-built UI 160) to reduce processing time.

In software systems with highly complex and configurable logic, different user interfaces are generated and presented based upon complex data models. These data models are retrieved from a data center in order to generate an associated user interface. In one embodiment, the present system and method predicts the user interface that will be displayed before the data model is retrieved. Therefore, the present system can much more quickly display the user interface once the workflow reaches the point when the user interface is to be shown and rendered on a display. Previous techniques did not have a prediction function but simply executed serially and in sequence according to the workflow until the operations terminated at one of the possible user interface elements.

One embodiment of the operation of the prediction system of FIG. 1 will be described with reference to an example workflow 200 shown in FIG. 2 and example method 300 shown in FIG. 3. Initially, the workflow 200 is described below with a set of example elements and how a serial operation of the workflow is executed. The example is then followed by method 300 that describes how the present branch prediction is implemented into the workflow 200 to predict and pre-build a user interface.

Figure 2:
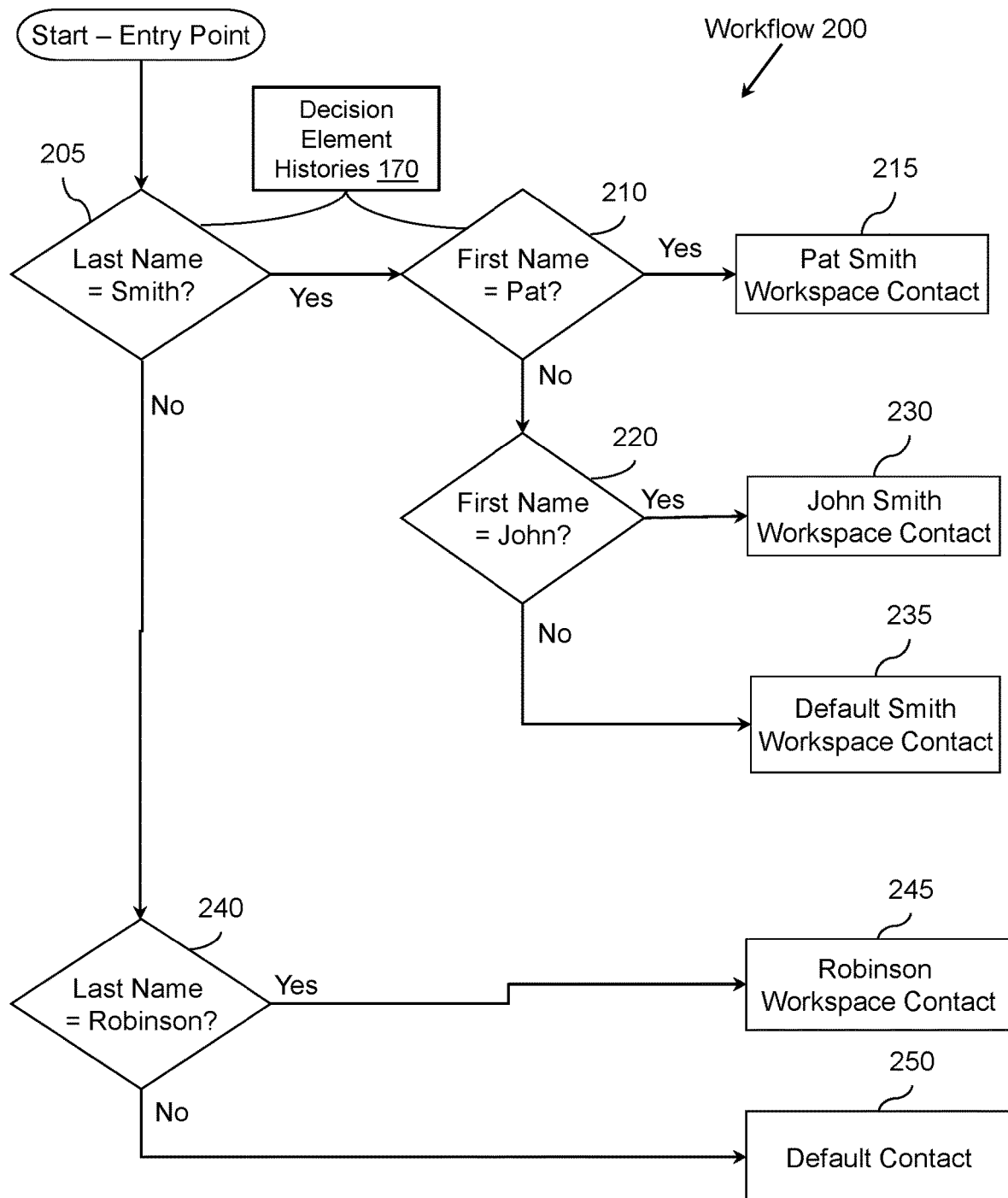
FIG. 2 illustrates one embodiment of a workflow including decision elements configured with branch prediction.

With reference to FIG. 2, the workflow 200 is configured with a number of decision elements and possible operations, which creates a workflow structure. In general, a workflow such as workflow 200 can be configured to have multiple decision elements (e.g., decision elements 205, 210, and 240) that create multiple paths along the workflow. The workflow may have multiple possible user interfaces (UI) that could be triggered at the end of one or more of the paths. A workspace element at the end of a path is referred to as a terminal element.

In one example, the computer-implemented workflow 200 is defined for handling data records for customer contacts for a call center. An operator handling a call at a call center will execute and navigate through the computer-implemented workflow 200. As an overview, the workflow can take multiple paths that have a sequence of elements and actions along each path. Various directions of the workflow path are controlled by the decision elements 205, 210, 220 and 240 along the path. Each decision element 205, 210, 220 and 240 includes logic that is configured to determine a result based on a value(s) from input data.

For example, decision element 205 is configured to determine if "Last Name=Smith". The decision is determined by actions from the operator that would initiate a network request to retrieve a data record from a database. In the example of the call center, the operator is working with a customer and thus the network request is made to retrieve a data record associated with the customer involved in the workflow. When the data record is retrieved and the data record values are loaded into memory, the decision element 205 can then determine whether the "Last Name" field in the data record equals "Smith" or not. The result of the determination leads the execution flow to an output branch along a "Yes" branch or a "No" branch.

In the example of FIG. 2, the output result from decision element 205 can be one of two paths based on whether the decision is "Yes" or "No" and leads to either decision element 210 or decision element 240, which are the next workflow elements sequentially along the path. Of course, a decision element can have more possible outputs based on the decision condition and input values being tested at that decision element.

At some point along the workflow, the operator will navigate along a certain sequential path and will end on a terminal element. The terminal element is configured to trigger a user interface as defined by the terminal element. The user interface is associated with what the operator is working on as defined by the navigated sequence in the path leading to the workflow element. In the workflow 200, the terminal elements are elements 215, 230, 235, 245, and 250. In this example, the terminal elements are associated with specific customer contacts and have a user interface (UI) that is based on the corresponding customer contact. Once the workflow reaches a terminal element, the system knows who the customer is and has retrieved corresponding data records for that customer. A customized user interface is then generated and built with records values for that customer. Of course, the present system is not limited to workflows for customer contacts but can be implemented for generating any type of user interface based off of any criteria defined by an administrator.

Referring again to decision element 205, if the decision determines that the data record does include a last name that equals "Smith," then the next decision element 210 determines if the "First Name=Pat." This decision is made by comparing the value in the "First Name" field from the data record that was previously retrieved. If the First Name is "Pat" (decision is "Yes"), then flow proceeds to workspace element 215, which is a terminal element and triggers a user interface (UI) for a workspace contact of Pat Smith.

In the sequential execution of the workflow, the system generates the corresponding UI when the operator reaches the end point in the sequence of serial workflow operations. Thus the workflow 200 has a serial dependency between the decision elements (that retrieve and load data in order to decide which path to take) and the final rendering of a user interface. In addition to waiting for the serial dependency to execute, generating the UI takes additional time since generating the UI is slow relative to the other actions and functions in the workflow. An example of time is provided below.

As previously stated, the decision elements 205, 210, 220 and 240 in the workflow are required to wait for input data before any decision can be made to continue along one of its output branches to the next action element. Thus in prior systems, any elements in the path after the decision element (including a terminal element to generate a UI) could not be executed until the decision elements were executed and the serial processing along the path reached the terminal element. Not only is the system response time delayed by waiting for each network request of the decision elements to be completed, but also generating the final UI is time intensive relative to the other actions thus adding more time to the serial processing.

Figure 3:
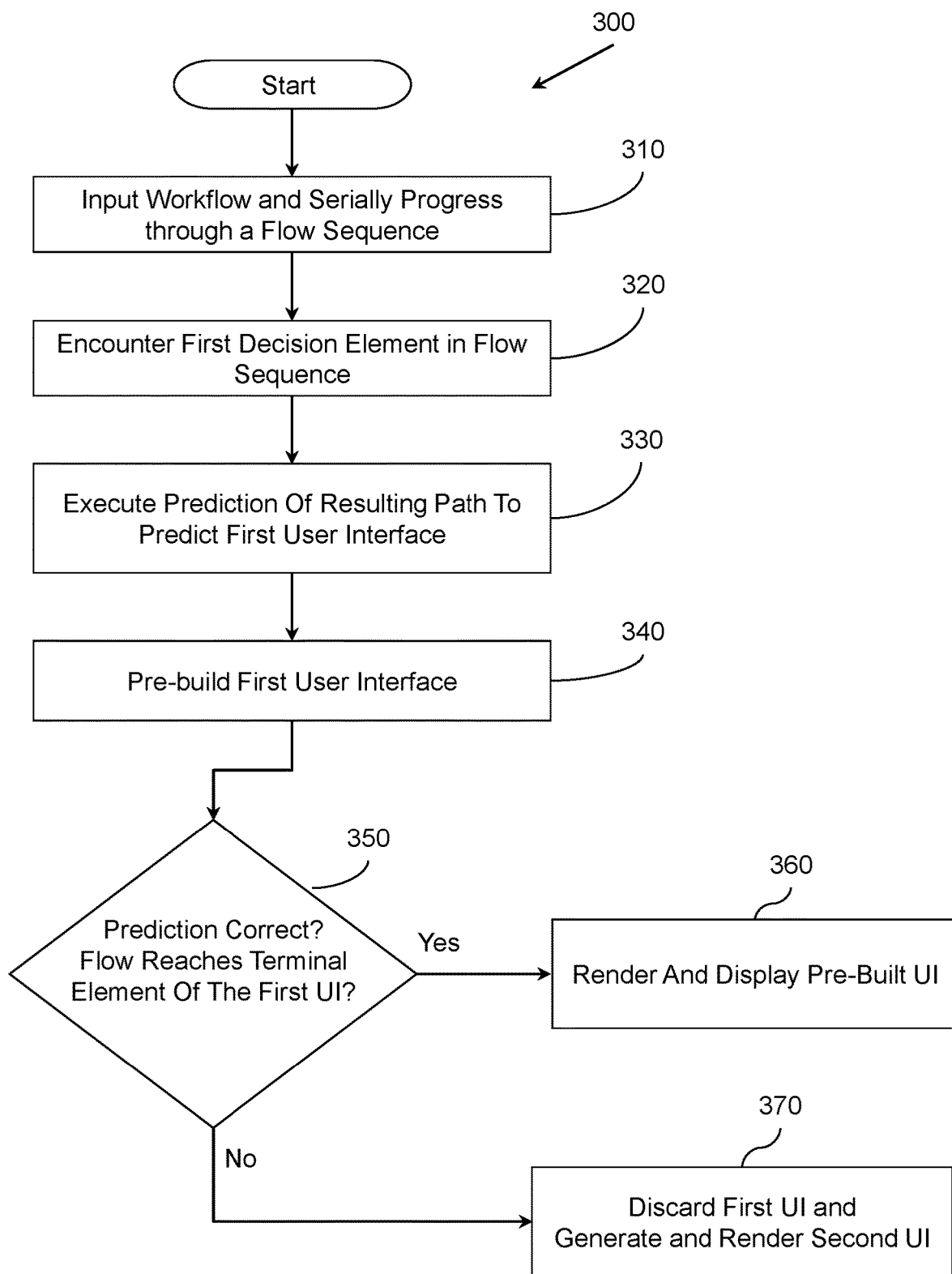
FIG. 3 illustrates one embodiment of a method associated with predicting branches of a workflow and pre-building a user interface.

With reference to FIG. 3, one embodiment of a computer-implemented method 300 is shown that is executed by the branch predictor 140 of FIG. 1. Method 300 is configured to make branch predictions at decision elements and pre-build a user interface (UI). Thus, the method predicts a final UI in advance without waiting for the serial execution of the workflow. When the predication is made, the method and system starts building the UI without waiting for a decision element to complete its processing and without waiting for the series of workflow actions being completed by the operator.

In one embodiment, upon initiation of a workflow, such as the workflow 200 of FIG. 2, method 300 is initiated and executes to make branch predictions. At block 310, one or more portions of the workflow structure is input into memory by at least the processor. The processor, in response to user inputs/actions, can serially progress and navigate through the workflow in a flow sequence.

As previously stated, the workflow 200 is configured with multiple execution paths that include a plurality of decision elements for controlling access to different portions of the execution paths. The multiple execution paths lead to a plurality of terminal elements associated with a plurality of user interfaces.

At block 320, the method and system monitors the workflow to determine when a decision element is encountered in the flow sequence. For example in the workflow 200 in FIG. 2, the first decision element encountered is element 205 that includes a plurality of branch paths. In response to the flow sequence encountering the first decision element in the workflow, at block 330, the processor (i) executes a prediction that predicts a resulting path of the first decision element to predict a first user interface from the plurality of user interfaces that may be encountered subsequently in the flow sequence as part of a first terminal element, and at block 340, (ii) pre-builds the first user interface that is predicted prior to encountering the first terminal element. Additional details of the prediction and the pre-building functions are provided below.

For purposes of discussion, assume the prediction predicts that the decision element 205 will result in the "Yes" branch and that the workflow will lead to the "Pat Smith" contact in terminal element 215 in FIG. 2. In one embodiment, the prediction is based (at least in part) on previous historical results of the decision element. This is further described below. The system also pre-builds/generates a user interface associated with the predicted Pat Smith contact. Thus as the decision element 205 executes its logic to determine if the "Last Name=Smith" as previously described, the prediction and the pre-building are executed concurrently and/or in parallel with the decision element logic. As such, the serial dependency of the prior techniques for processing decision elements and rendering a user interface are removed, which improves the computer functionality by improving the workflow processing time. The decision element logic includes requesting and retrieving a database record via a network request to a database, and determining if the retrieved database record has a field for "Last Name" that is "Smith" or not "Smith."

In one embodiment, when the system predicts the user interface (UI) and starts building the UI, the UI is not displayed or shown to the user. The predicted UI is built in memory and queued up in a background process. The system cannot start showing the pre-built predicted UI because the predicted UI might end up being the wrong UI (e.g., the workflow ends up on a different terminal element with a different UI). The system cannot show the wrong UI on the display screen because that would be a processing error and confusing to the user. If the UI is correct, then information from the corresponding data record is filled into the UI and the UI is displayed.

With continued reference to method 300 in FIG. 3, at block 350, the system determines whether the prediction is correct. This may be determined by, for example, determining which terminal element the workflow sequence ultimately reaches. In response to the flow sequence reaching the predicted terminal element of the Pat Smith Contact 215, the prediction is determined as correct and the pre-built user interface is displayed and presented on a display device.

In the example workflow 200, it is noted that along the "Yes" path of Last Name=Smith, there is a second decision element 210 for "First Name=Pat." Any number of decision elements could be encountered in a workflow path. In one embodiment, the branch prediction is executed again for the second decision element, which may result in the same prediction or a different prediction.

Returning to the decision block 350 in FIG. 3, if the flow sequence does not take the predicted path and reaches a different terminal element that was not predicted, then the prediction is incorrect. Method 300 then moves to block 370 where in response to the flow sequence reaching a different terminal element, the processor is caused to discard the pre-built user interface that was predicted. The system then generates a new user interface that associated with the terminal element that the workflow actually reached. For example in FIG. 2, if the actual terminal element reached is the John Smith Contact element 230, then the predicted user interface for the Pat Smith Contact is discarded. Then a user interface associated with the John Smith Contact is generated and rendered on the display screen.

Building the user interface is one of the more time intensive operations in the system (e.g., taking about 300 ms to 500 ms). Thus if the prediction is correct, the final UI is already built (or nearly built) and is ready for presentation and use by the time the operator reaches that end point in the workflow sequence. This reduces the amount of processing time required by the system as compared to the serial processing of the workflow. An example time comparison is described below.

In another embodiment of method 300, the method may predict a branch path and an associated action to one or more data records. For example, a predicted action may create, delete, or otherwise modify data from a predicted data record in advance of the workflow reaching a terminal element. In this case, a user interface is not part of the terminal element but rather an action on the predicted data record is performed. For example, if the predictor predicts a certain branch at a decision element which leads to a terminal element with a record modification action, the system pre-executes the record modification action in parallel with the processing of the decision element (as explained previously). The pre-execution may include accessing a database to retrieve the associated data record and perform the data modification on the data record. If the prediction is wrong and the workflow ends up at a different terminal element, the data modification is disregarded and not saved in the database. If the prediction is correct, the modified record is saved and updated in the database.

Tournament Predictor

In one embodiment, the branch predictor 140 in FIG. 1 and the associated prediction function (block 330 in FIG. 3) is implemented with a tournament predictor. In one embodiment, the branch prediction is built with a software algorithm and is concerned with reducing long timeframes dealing with network requests for data records and data center response times for returning the requested data records. These network requests and data records that are part of or required for decision elements.

As described previously, when a workflow reaches a decision element/node, the system triggers the prediction function. For example, the decision node determines an output branch based on a customer name as the example in FIG. 2. For each decision element in the workflow, a history of paths taken by the decision element is maintained. In one embodiment, four (4) previous paths taken by the decision element are stored in a predictor history data structure for that decision element. For decision element 205, the path history may be Yes, Yes, Yes, No. Output paths may also be labeled in other ways such as path history A, A, A, B. Of course, any number of previous paths may be stored for a decision element. This path history is maintained, for example, in a data structure of decision element histories 170 shown associated with decision element 205 and 210.

Each element in a workflow is assigned a unique ID so the system can identify and track the workflow element. Each path may also be assigned a unique ID to identify the path from all other paths in the workflow. The predictor history data structure may be arranged to map or associate each decision element ID with its correspond path history. Thus, a path history for a selected decision element may be identified and retrieved when requested for making a prediction.

When the workflow reaches a decision element and if there is no history data (meaning that the system is at this decision node for the first time), then the decision element is executed without a prediction. This includes: receive input data, retrieve corresponding data record (e.g., customer contact record), evaluate the record "name" field; and decide output branch based on name field value. The system then saves the output path taken in the history data for that decision element (e.g., path "A"), When the history data is retrieved for this decision element, the history data represents that the last time the workflow was at this decision element, the workflow went to path "A". After a number of predictions are made for a decision element, the system also stores and maintains an accuracy of the predictions, which are determined based on the actual output path taken.

If multiple decision elements are in the workflow, then the system has multiple predictions that happen: one predictor for each decision element based on the last four (4) history paths taken for that decision element. Since each path has an assigned ID and an associated prediction accuracy, the system compares each predictor from the decision elements to each other and to determine which predictor has been the most accurate. If a first predictor at a first decision element was accurate in the last prediction, the system trusts that predictor more than an inaccurate predictor. In one embodiment, each predictor is assigned a confidence value corresponding to how accurate the previous predictions have been. For example, the most frequent path chosen in the past will be given greater weight and be selected as the next prediction. Thus, if a path history for a decision element has been paths A, A, A, B, then path A will be the next predicted path since path A has been the most frequent path chosen between paths A and B. The confidence value of path A is 75% (3 out of 4 last results).

As previously described, the decisions made in decision elements are based on data records having a specified field value. The tournament predictor for each decision element is implemented to predict an outcome of the decision element and thus a resulting branch path. The predictor also executes in parallel with and/or concurrently with the processing of the decision element. Thus the predictor executes and makes a prediction of the result without waiting for or knowing the actual field values from the retrieved data records.

In one embodiment, the system implements two types of predictors that are used to try to predict the path that will be taken through a workflow: a record based history predictor, and a global history predictor. Each decision element in a workflow is already given a unique ID, which is associated with the predictors. For each decision element, the following predictors are used to determine the most likely output path to be taken:

1) Record Based History Predictor. This predictor stores and uses historical data specifically for a selected data record. For example, the system generates a history predictor for the data record of "John Smith" and stores the last X decision results made with that record. For many customers, a given record may be opened many times and will behave consistently each time that it is opened. When an agent opens a data record (John Smith) during a workflow, the system determines what characteristics in the data record the agent is looking at. The characteristics may include job title, position, location, department, and/or other attributes that may appear in the data record. Each different characteristic may result in a different user interface being generated with customized data associated with the characteristic. Suppose the record history for the John Smith record shows that the record was opened four times and the "Title" data field was "Director" each time. The next time the record is opened, the predictor predicts the Title is still "Director" based on the previous history, and predicts the corresponding output path and user interface based on the characteristic being "Director."

As another example, suppose a workflow has a branch path based on the record being created on a certain day and the record being related to a certain topic. Those attributes are not likely to change between times that an agent opens the record. Knowing the paths that the workflow previously took when processing this record would be a strong predictor of the path that the workflow would take again for the same record the next time the record is opened in the workflow.

2) Global History Predictor. Rather than using the history of a single data record as in the record based history predictor, the global history predictor looks at the history across many different records, which may include the history of all records in a selected category. For example, the global history predictor looks at multiple records that have a common characteristic and that history is used to predict an output path at a decision element. The record based history predictor may not have any data for a given record, but the global history may provide a prediction into what the agent is doing in general regardless of the actual workflow assigned to the agent.

It is also possible that there are different workflows that would treat the same record differently each time that record is opened. This could be through something like an escalation process that automatically changes values on the record. In these cases the previous paths may not be repeated by a decision element. Recall that different workflows are assigned to an agent based on the type of task being performed or the type of data record opened by the agent. Each workflow may be configured differently to handle a particular task and will have different workflow elements. For example, if an agent opens a "contact" data record, then the system assigns a contact workflow to the agent to follow. If an "incident" task record is open (to handle an incident report), then the system assigns an incident workflow for the agent to follow.

In one embodiment, each predictor keeps track of its own accuracy. The tournament aspect is where the predicted path from a predictor with the best historical accuracy is selected as the overall predicted path. Each predictor that participates in a tournament prediction scheme can be arbitrarily complex. In another embodiment, the predictors may be built using more advanced machine learning concepts or pattern matching schemes.

In another embodiment, for each predictor of a decision element/node, the system maintains two queues. The two queues are stored in the decision element histories 170 associated with each decision element (shown in FIGS. 1 and 2). If using the length of four (4) again as used above, the system has one queue that contains the predictions made by that decision element predictor over the last 4 runs, while a second queue maintains the actual path taken in the last 4 runs. These are used to compute two things, (1) a path prediction P based on the actual paths historically taken and (2) a confidence C based on the performance of that particular predictor over the history window.

For example, let D be a decision node with output paths P∈{X, Y, Z} and let the following Table 1 show example histories that have been recorded for three predictors after having encountered this decision node four times:

TABLE 1

| Predictor Histories | |
| --- | --- |
| Predictor 1 | |
| Actual History: | X Y X |
| Prediction History: | X Y |
| Predictor 2 | |
| Actual History: | X Z Y Z |
| Prediction History: | X Z Y |
| Predictor 3 | |
| Actual History: | X Z |
| Prediction History: | X Z |

The next time the system reaches this decision node, a prediction is computed for each of the registered predictors. The prediction contains two components: The output path P∈{X, Y, Z} and the confidence C∈[0, 1].

P is computed as the most frequent output of the actual history, while C is computed as the accuracy of that predictor over the history length, comparing its own predictions to the actual results.

For Predictor 1:

| | |
| --- | --- |
| P = X | // 2 X's and 2 Y's, tie goes to the more recent history being X |
| C = 0.50 | // 2 correct of the last 4 |

For Predictor 2:

| | |
| --- | --- |
| P = Z | // 2 of last 4 |
| C = 0.25 | // 1 of last 4 correct |

For Predictor 3:

| | |
| --- | --- |
| P = Z | // More recent predictions win in a tie |
| C = 0.75 | // 3 of last 4 correct |

Now the system has a tournament selection between each of the predictors where it takes the one with the highest confidence. Predictor 3 wins with its highest confidence of 75% and the overall result is a path prediction of Z. The reason that each of these predictors can have a different actual history is that they can be registered for different scopes, where they may not apply in all the same situations as the others and thus be exposed to different scenarios and thus record different histories.

In one embodiment, in the case of a tie in the confidence amongst two predictors that are predicting different paths, the system performs an implicit ordering based on which types of predictors are believed to provide more accurate results specifically within the domain of the associated product.

Results

In one embodiment, example performance results were measured from enabling the present branch prediction system on a service cloud test site. In the test, the test opens the same record 5 times and records the average time to show a resulting user interface so that the test system can monitor for performance regressions. This particular test has a workflow with a decision element based on if a service request has been closed. The system assumes that agents should not be opening as many "closed" requests as they do "active" requests, so the system makes that prediction automatically (with no prior knowledge of the actual workflow). Based on the prediction, the system pre-builds a predicted user interface, which ultimately leads to rendering the user interface. The time for completion is measured with prediction and without prediction (e.g., the serial process). The prediction system was able to lower the time to open an active service request and render the corresponding user interface from about 5 seconds (for the serial process) to about 3 seconds (when using the prediction system).

Generating/Pre-Building a User Interface

The following is an example embodiment of operations performed for generating/pre-building a user interface as previously described. With reference to the workflow 200 in FIG. 2, the terminal workspace contact elements 215, 230, 235, 245, and 250 trigger different user interfaces that could be shown to the user/agent depending on which branch is taken along the workflow.

When a prediction is made at a decision element, the system builds the user interface as a webpage as follows, in one embodiment:

The structure, or skeleton of the webpage is defined according to HTML, while the content of the page is defined according to the data that gets bound to that skeleton. There are a number of steps involved joining these together and actually drawing visible elements to a display screen, however that is handled by a rendering engine of a browser and is beyond the scope of this disclosure.

The building of the user interface is performed prior to the actual rendering step. The steps that the browser performs to render the user interface on a webpage are separate from the building of the user interface. To build the user interface, the system uses:

(1) A fully expanded HTML tree that describes a layout of a given workspace (e.g., the workflow structure and elements in the workflow 200 that represent the different UIs shown in FIG. 2). As a workspace is totally configurable, each element within them, i.e. a text field, a button, an image, a table etc. is defined by a unique block of HTML. In order to ask the browser to render the workspace, the system puts all the pieces together into one object.

(2) Secondly, the system uses a corresponding data structure that matches up to the HTML tree and holds the content that will be displayed. i.e. The HTML defines the text box we want to show, while this data structure tree defines what we actually show in that text box. We refer to these backing data structures as View Models, and we need to build out the same composite tree of both HTML and View Models that define the structure and content of the UI we want to show.

Workspace Elements can be arbitrarily complex. A user is capable of adding any number of fields, controls and even custom extensions to their workspace. In some systems, when building a presentation design pattern, each item that is shown on a workspace is constructed using a MVVM design pattern (Model-View-ViewModel MVVM). This means that there is a view and a view model that get bound back to the model of the original data. Constructing the view and view model are somewhat expensive operations in terms of time and computing resources and by starting those operations sooner by making a prediction, a large performance gain can be realized. With this invention the view and view model can be created and then bound to the view model at a later point in time.

In one embodiment for the system to build both of the components (1) and (2) above, the system uses a workspace definition (our data representation that contains what a customer wants to see for their UI). For example, the contact workspace elements in the workflow 200 of FIG. 2 show different terminal elements that could be reached in the workflow 200. One purpose of the present prediction system is to allow the construction of the two trees described in (1) and (2) above before the system actually knows for certain which one of the workspace contacts the user will end up on when serially navigating along the workflow 200.

In one embodiment, these workspace definitions are defined on a browser client so the system can build any one when triggered. The system just does not know which one until an actual data record is retrieved (as part of the decision element) to identify what the agent/user is trying to access and view. The present prediction system is implemented and executes at this point in the workflow to make a prediction as to which one of the possible workspaces and associated user interface the system should try to build in advance. The prediction and pre-building of the user interface is performed concurrently while the system is waiting for the network request to retrieve the data record from a database and determine the result of the decision element.

Processing Comparison

As a comparison, the serial processing of a decision element is performed as follows:

1) Transmit a network request to a database to get a record the agent/user wants to see;
2) System waits for the record to be returned via network communication, then loads the record and its field values into memory. The decision element then determines a result of its decision based on a selected field value. The result correspond to an output branch in the workflow that leads to a resulting user interface to build;
3) Build the HTML and View Model trees for the resulting user interface;
4) Transmit the user interface to a browser engine to be rendered.

With the present prediction system, when the decision element is encountered, instead of having to wait for the network request to complete from steps one and two, the system transmits the same request, but while waiting for the record to be returned, the system in-parallel makes a prediction on a user interface and starts pre-building the user interface (e.g., building the HTML and View Models from the prediction).

When the requested record is returned and its field value (s) analyzed, the prediction system confirms if the prediction was correct or not based on the result of the decision element. If the prediction is correct, the system just continues and completes the building of the user interface that has already been started (if not yet complete). Thus, the system effectively reduces the perceived load time by the time it took to make the network request and load the retrieved record. If the prediction is wrong, the pre-built user interface is discarded/deleted and the system resumes processing at step 2 like before. It is noted that the penalty for being wrong is essentially nothing since the prediction processing is done in parallel.

Some estimated time numbers may give some context. For a standard user interface that is generated and rendered, on a computer with an appropriate network connection speed, it might take 300 ms to 500 ms (milliseconds) to perform all the work to build out the HTML and View Models after the data record is retrieved and the decision element completes. It may take about 100 ms to 200 ms for the network request to fetch the data record that tells the system what user interface to build. Adding this time, the serial processing method would take the network trip+the processing time=400 ms to 700 ms. With the present system and method that executes these steps in parallel based on the novel prediction technique, the system is just bounded by the processing time of 300 ms to 500 ms for building the user interface. Thus this is an improvement to the computer functionality and to the prior technological process.

The timings may be dependent on many factors, but regardless of internet and computer speed, the end result is that the present system is able to remove the serial dependency of the operations by implementing a prediction technique. The prediction technique allows for the operations to be performed concurrently which could not be performed as such in the previous serially dependent technique.

Cloud or Enterprise Embodiments

In one embodiment, the prediction system/branch predictor 140 and/or the configured computing device 100 shown in FIG. 1 is a computing/data processing system including an application or collection of distributed applications for enterprise organizations. The applications and computing system 100 may be configured to operate with or be implemented as a cloud-based networking system, a software as a service (SaaS) architecture, or other type of networked computing solution. In one embodiment the branch predictor 140 and/or method 300 is a centralized server-side application that provides at least the functions disclosed herein and that is accessed by many users via computing devices/terminals communicating with the computing system 100 (functioning as the server) over a computer network.

In one embodiment, one or more of the components described herein are configured as program modules stored in a non-transitory computer readable medium. The program modules are configured with stored instructions that when executed by at least a processor cause the computing device to perform the corresponding function(s) as described herein.

Computing Device Embodiment

Figure 4:
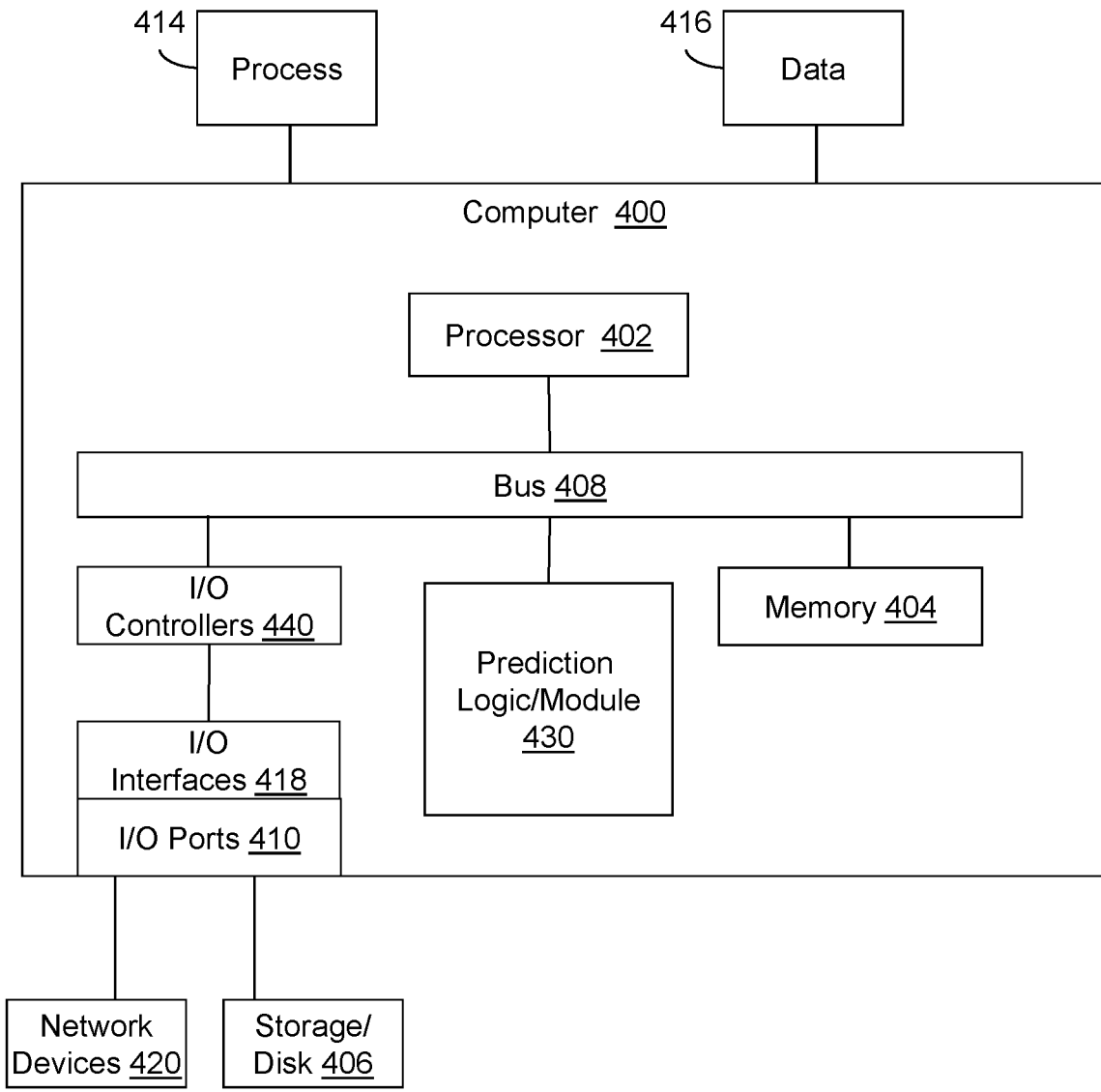
FIG. 4 illustrates an embodiment of a computing system configured with the example prediction systems and/or methods disclosed.

FIG. 4 illustrates an example computing device that is configured and/or programmed as a special purpose computing device with one or more of the example systems and methods described herein, and/or equivalents. The example computing device may be a computer 400 that includes a processor 402, a memory 404, and input/output ports 410 operably connected by a bus 408. In one example, the computer 400 may include prediction logic/module 430 configured to facilitate the prediction system of computing device 100 and branch predictor 140 shown in FIG. 1, and the method 300 shown in FIG. 3. In different examples, the logic 430 may be implemented in hardware, a non-transitory computer-readable medium with stored instructions, firmware, and/or combinations thereof. While the logic 430 is illustrated as a hardware component attached to the bus 408, it is to be appreciated that in other embodiments, the logic 430 could be implemented in the processor 402, stored in memory 404, or stored in disk 406.

In one embodiment, logic 430 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

Computer 400 and prediction logic 430 are structure to provide means (e.g., hardware, non-transitory computer-readable medium that stores executable instructions, firmware) for performing the present prediction system.

Generally describing an example configuration of the computer 400, the processor 402 may be a variety of various processors configured to operate and be controlled by the prediction logic 430 including dual microprocessor and other multi-processor architectures. A memory 404 may include volatile memory and/or non-volatile memory. Non-volatile memory may include, for example, ROM, PROM, and so on. Volatile memory may include, for example, RAM, SRAM, DRAM, and so on.

A storage disk 406 may be operably connected to the computer 400 via, for example, an input/output (I/O) interface (e.g., card, device) 418 and an input/output port 410 that are controlled by at least an input/output (I/O) controller 440. The disk 406 may be, for example, a magnetic disk drive, a solid state disk drive, a floppy disk drive, a tape drive, a Zip drive, a flash memory card, a memory stick, and so on. Furthermore, the disk 406 may be a CD-ROM drive, a CD-R drive, a CD-RW drive, a DVD ROM, and so on. The memory 404 can store a process 414 and/or a data 416, for example. The disk 406 and/or the memory 404 can store an operating system that controls and allocates resources of the computer 400.

The computer 400 may interact with input/output (I/O) devices via the I/O interfaces 418 and the input/output ports 410 via input/output (I/O) controllers 440. Input/output devices may be, for example, a keyboard, a microphone, a pointing and selection device, cameras, video cards, displays, the disk 406, the network devices 420, and so on. The input/output ports 410 may include, for example, serial ports, parallel ports, and USB ports.

The computer 400 can operate in a network environment and thus may be connected to the network devices 420 via the I/O interfaces 418, and/or the I/O ports 410. Through the network devices 420, the computer 400 may interact with a network. Through the network, the computer 400 may be logically connected to remote computers. Networks with which the computer 400 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one or a combination of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computing system, comprising:
at least one processor;
at least one memory operably connected to the at least one memory;
a non-transitory computer readable medium having stored thereon instructions that when executed by at least the processor cause the processor to:
input, by at least the processor into a memory, a workflow and serially progressing through the workflow in a flow sequence;
wherein the workflow is configured with multiple execution paths that include a plurality of decision elements for controlling access to different portions of the execution paths, wherein the multiple execution paths lead to a plurality of terminal elements associated with a plurality of user interfaces;
in response to the flow sequence encountering a first decision element in the workflow that includes a plurality of branch paths:
  (i) execute a prediction that predicts a resulting path of the first decision element to predict a first user interface from the plurality of user interfaces that may be encountered subsequently in the flow sequence as part of a first terminal element; and
  (ii) pre-build the first user interface that is predicted prior to encountering the first terminal element;
in response to the flow sequence reaching the first terminal element, (i) display the pre-built first user interface on a display device, (ii) mark the prediction as correct to maintain an accuracy of predictions for the first decision element, and (iii) associate the prediction in a history of paths taken from the first decision element; and
in response to the flow sequence reaching a second terminal element, discard the pre-built first user interface and generate a second user interface associated with the second terminal element.

2. The computing system of claim 1, wherein the instructions for pre-building the first user interface that is predicted further comprise instructions to cause the processor to:
generate a structure and associated data of the first user interface in the memory; and
maintain the first user interface internal in the memory without rendering the first user interface on the display device until the processor confirms that the flow sequence reaches the first terminal element to trigger the first user interface.

3. The computing system of claim 1, further comprising instructions that when executed by at least the processor cause the processor to:
in response to the workflow reaching a second decision element, execute the prediction and predict a second resulting user interface based at least in part on a history of paths taken from the second decision element; and
if the second resulting user interface is different than the predicted first user interface, discard the pre-built first user interface and generate the second resulting user interface.

4. The computing system of claim 1, further comprising instructions that when executed by at least the processor cause the processor to:

for each decision element in the workflow, maintain a history of paths taken at the corresponding decision element during previous executions of the workflow; and generate a confidence value for each branch path from the corresponding decision element based on the history of paths taken.

5. A computer-implemented method performed by a computing device including at least a processor executing instructions from a memory, the method comprising:

inputting, by at least the processor into a memory, a workflow and serially progressing through the workflow in a flow sequence;

wherein the workflow is configured with multiple execution paths that include a plurality of decision elements for controlling access to different portions of the execution paths, wherein the multiple execution paths lead to a plurality of terminal elements associated with a plurality of user interfaces;

in response to the flow sequence encountering a first decision element in the workflow that includes a plurality of branch paths:
  (i) executing a prediction that predicts a resulting path of the first decision element to predict a first user interface from the plurality of user interfaces that may be encountered subsequently in the flow sequence as part of a first terminal element; and
  (ii) pre-building the first user interface that is predicted prior to encountering the first terminal element;

in response to the flow sequence reaching the first terminal element: (i) displaying the pre-built first user interface on a display device, (ii) marking the prediction as correct to maintain an accuracy of predictions for the first decision element, and (iii) associating the prediction in a history of paths taken from the first decision element; and in response to the flow sequence reaching a second terminal element, discarding the pre-built first user interface and generate a second user interface associated with the second terminal element.

6. The method of claim 5, wherein pre-building the first user interface that is predicted further comprises:

generating a structure and associated data of the first user interface in the memory; and maintaining the first user interface internal in the memory without rendering the first user interface on the display device until the processor confirms that the flow sequence reaches the first terminal element to trigger that first user interface.

7. The method of claim 5, further comprising:

for each decision element in the workflow, maintaining a history of paths taken at the corresponding decision element during previous executions of the workflow; and generating a confidence value for each branch path from the corresponding decision element based on the history of paths taken.

8. A non-transitory computer-readable medium that includes stored thereon computer-executable instructions that when executed by at least a processor of a computer cause the computer to:

input, by at least the processor into a memory, a workflow and serially progressing through the workflow in a flow sequence;

wherein the workflow is configured with multiple execution paths that include a plurality of decision elements for controlling access to different portions of the execution paths, wherein the multiple execution paths lead to a plurality of terminal elements associated with a plurality of user interfaces;

in response to the flow sequence encountering a first decision element in the workflow that includes a plurality of branch paths:
  (i) execute a prediction that predicts a resulting path of the first decision element to predict a first user interface from the plurality of user interfaces that may be encountered subsequently in the flow sequence as part of a first terminal element; and
  (ii) pre-build the first user interface that is predicted prior to encountering the first terminal element;

in response to the first decision element outputting a first result path that leads to the predicted first user interface, display the pre-built first user interface on a display device; and in response to the first decision element outputting a second result path that reaches a second decision element, execute the prediction and predict a second user interface based at least in part on a history of paths taken from the second decision element; and if the predicted second user interface is different than the pre-built first user interface, discard the pre-built first user interface and generate the predicted second user interface associated with the second result path.

9. The non-transitory computer-readable medium of claim 8, wherein the instructions for pre-building the first user interface that is predicted further comprise instructions to cause the processor to:

generate a structure and associated data of the first user interface in the memory; and maintain the first user interface internal in the memory without rendering the first user interface on the display device until the processor confirms that the flow sequence reaches the first terminal element to trigger the first user interface.

10. The non-transitory computer-readable medium of claim 8, further comprising instructions that when executed by at least the processor cause the processor to:

for each decision element in the workflow, maintain a history of paths taken at the corresponding decision element during previous executions of the workflow; and generate a confidence value for each branch path from the corresponding decision element based on the history of paths taken.

11. A computer-implemented method performed by a computing device including at least a processor executing instructions from a memory, the method comprising:

input, by at least the processor into a memory, a workflow and serially progressing through the workflow in a flow sequence;

wherein the workflow is configured with multiple execution paths that include a plurality of decision elements for controlling access to different portions of the execution paths, wherein the multiple execution paths lead to a plurality of terminal elements associated with a plurality of user interfaces;

in response to the flow sequence encountering a first decision element in the workflow that includes a plurality of branch paths:
  (i) executing a prediction that predicts a resulting path of the first decision element to predict a first user interface from the plurality of user interfaces that may be encountered subsequently in the flow sequence as part of a first terminal element; and (ii) pre-building the first user interface that is predicted prior to encountering the first terminal element;
in response to the first decision element outputting a first result path that leads to the predicted first user interface, display the pre-built first user interface on a display device; and
in response to the first decision element outputting a second result path that reaches a second decision element, execute the prediction and predict a second user interface based at least in part on a history of paths taken from the second decision element; and
if the predicted second user interface is different than the pre-built first user interface, discard the pre-built first user interface and generate the predicted second user interface associated with the second result path.

12. The method of claim 11, further comprising:
in response to the flow sequence reaching the first terminal element:
marking the prediction as correct to maintain an accuracy of predictions for the first decision element; and
associating the prediction in a history of paths taken from the first decision element.

13. The method of claim 11, further comprising:
for each decision element in the workflow, maintaining a history of branches taken at the corresponding decision element during previous executions of the workflow; and
generating a confidence value for each branch path from the corresponding decision element based on the history of branches taken.

14. A non-transitory computer-readable medium that includes stored thereon computer-executable instructions that when executed by at least a processor of a computer cause the computer to:
input, by at least the processor into the memory, a workflow and serially progressing through the workflow in a flow sequence;
wherein the workflow is configured with multiple execution paths that include a plurality of decision elements for controlling access to different portions of the execution paths, wherein the multiple execution paths lead to a plurality of terminal elements associated with a plurality of user interfaces;
for each decision element in the workflow, maintain a history of branch paths taken at the corresponding decision element during previous executions of the workflow;
generate a confidence value for each branch path from the corresponding decision element based on the history of branch paths taken;
in response to the flow sequence encountering a first decision element in the workflow that includes a plurality of branch paths:
(i) execute a prediction that predicts a resulting path of the first decision element to predict a first user interface from the plurality of user interfaces that may be encountered subsequently in the flow sequence as part of a first terminal element;
wherein the prediction is based at least on the confidence value for each branch path of the plurality of branch paths from the first decision element; and
(ii) pre-build the first user interface that is predicted prior to encountering the first terminal element;
in response to the flow sequence reaching the first terminal element, display the pre-built first user interface on a display device; and
in response to the flow sequence reaching a second terminal element, discard the pre-built first user interface and generating a second user interface associated with the second terminal element.

15. The non-transitory computer-readable medium of claim 14, wherein the instructions for pre-building the first user interface that is predicted further comprise instructions to cause the processor to:
generate a structure and associated data of the first user interface in the memory; and
maintain the first user interface internal in the memory without rendering the first user interface on the display device until the processor confirms that the flow sequence reaches the first terminal element to trigger the first user interface.

16. The non-transitory computer-readable medium of claim 14, further comprising instructions that when executed by at least the processor cause the processor to:
in response to the flow sequence reaching the first terminal element:
mark the prediction as correct to maintain an accuracy of predictions for the first decision element; and
associate the prediction in the history of branch paths taken from the first decision element.

17. A computing system, comprising:
at least one processor;
at least one memory operably connected to the at least one memory;
a non-transitory computer readable medium having stored thereon instructions that when executed by at least the processor cause the processor to:
input, by at least the processor into the memory, a workflow and serially progressing through the workflow in a flow sequence;
wherein the workflow is configured with multiple execution paths that include a plurality of decision elements for controlling access to different portions of the execution paths, wherein the multiple execution paths lead to a plurality of terminal elements associated with a plurality of user interfaces;
for each decision element in the workflow, maintain a history of branch paths taken at the corresponding decision element during previous executions of the workflow;
generate a confidence value for each branch path from the corresponding decision element based on the history of branch paths taken;
in response to the flow sequence encountering a first decision element in the workflow that includes a plurality of branch paths:
(i) execute a prediction that predicts a resulting path of the first decision element to predict a first user interface from the plurality of user interfaces that may be encountered subsequently in the flow sequence as part of a first terminal element;
wherein the prediction is based at least on the confidence value for each branch path of the plurality of branch paths from the first decision element; and
(ii) pre-build the first user interface that is predicted prior to encountering the first terminal element;
in response to the flow sequence reaching the first terminal element, display the pre-built first user interface on a display device; and
in response to the flow sequence reaching a second terminal element, discard the pre-built first user interface and generating a second user interface associated with the second terminal element.

18. The computing system of claim 17, further comprising instructions that when executed by at least the processor cause the processor to:
   in response to the flow sequence reaching the first terminal element:
      mark the prediction as correct to maintain an accuracy of predictions for the first decision element; and
      associate the prediction in a history of paths taken from the first decision element.

19. The computing system of claim 17, further comprising instructions that when executed by at least the processor cause the processor to:
   in response to the workflow reaching a second decision element, execute the prediction and predict a second resulting user interface based at least in part on a history of branch paths from the second decision element; and
   if the second resulting user interface is different than the predicted first user interface, discard the pre-built first user interface and generate the second resulting user interface.

20. The computing system of claim 17,
   wherein each decision element is configured to determine a result based on a decision condition of one or more input values that control the result causing the progression along an output branch path in the workflow; and
   wherein the one or more input values are received by initiating a network request to a database and retrieving a data record, loading the data record and associated values from the data record into the memory, and resolving the decision condition based on the associated values.

\* \* \* \* \*

UNITED STATES PATENT AND TRADEMARK OFFICE
CERTIFICATE OF CORRECTION

PATENT NO. : 11,803,419 B2
APPLICATION NO. : 17/965101
DATED : October 31, 2023
INVENTOR(S) : Moltzan et al.

Page 1 of 1

It is certified that error appears in the above-identified patent and that said Letters Patent is hereby corrected as shown below:

In the Claims

In Column 16, Line 9, in Claim 1, delete "memory" and insert -- processor --, therefor.

In Column 16, Line 13, in Claim 1, delete "a memory" and insert -- the at least one memory --, therefor.

In Column 20, Line 28, in Claim 17, delete "memory" and insert -- processor --, therefor.

Signed and Sealed this
Twenty-second Day of October, 2024

Katherine Kelly Vidal
*Director of the United States Patent and Trademark Office*